United States Patent [19]
Oweis

[11] Patent Number: 5,314,544
[45] Date of Patent: May 24, 1994

[54] HIGH-SPEED NON-DESTRUCTIVE CLEANING OF METAL FOAM SUBSTRATE OF ELECTROMECHANICAL CELL ELECTRODES

[75] Inventor: Salah Oweis, Ellicott City, Md.

[73] Assignee: Saft America, Inc., Valdosta, Ga.

[21] Appl. No.: 62,213

[22] Filed: May 18, 1993

[51] Int. Cl.⁵ ............................. B08B 5/00; B08B 7/02
[52] U.S. Cl. ............................................. 134/5; 134/6; 134/7; 134/19; 134/21; 134/26
[58] Field of Search ................... 134/5, 6, 7, 19, 21, 134/26

[56] References Cited

U.S. PATENT DOCUMENTS

| | | | |
|---|---|---|---|
| 1,940,385 | 12/1933 | Ackermann | 429/221 |
| 4,439,281 | 3/1984 | Schneider et al. | 204/2.1 |
| 4,975,230 | 12/1990 | Pinkhasov | 264/59 |
| 5,086,969 | 2/1992 | Guerinault et al. | 228/189 |
| 5,196,281 | 3/1993 | Pensabene et al. | 429/211 |

FOREIGN PATENT DOCUMENTS

| | | |
|---|---|---|
| 571863 | 1/1980 | Japan . |
| 63-40252 | 2/1988 | Japan . |
| 63-40253 | 2/1988 | Japan . |
| 63-40254 | 2/1988 | Japan . |

Primary Examiner—R. Bruce Breneman
Assistant Examiner—Zeinab El-Arini
Attorney, Agent, or Firm—Sughrue, Mion, Zinn, Macpeak & Seas

[57] ABSTRACT

A localized surface area of an open foam type metal substrate of an electrochemical cell electrode, where the substrate is filled with active material and compressed, is subjected to light pressure scrubbing by a heated soldering iron tip subjected to ultrasonic vibration to quickly dislodge the active material network of the open foam type metal substrate. Compressed air at approximately 100 psi is blown through the open foam type metal substrate to remove dislodged active material particles from the foam type metal substrate to permit effective welding of a metal terminal connection to the substrate at the localized area after cleaning. Alternatively, both opposite surfaces of the open foam type metal substrate at the localized area may be brushed to initially dislodge the active material from the pores of the open foam type metal substrate and the dislodged particles blown through the substrate from one surface to the other. Preferably, suction is applied to the opposite surface of the substrate from that subjected to the compressed air blowing to facilitate the removal of dislodged particles of active material.

13 Claims, 2 Drawing Sheets

HIGH-SPEED NON-DESTRUCTIVE CLEANING OF METAL FOAM SUBSTRATE OF ELECTROMECHANICAL CELL ELECTRODES

This invention relates to effecting bonding of a metal strip connector to an electrochemical cell electrode having a foam type substrate, and more particularly to an effective high-speed, localized cleaning of such porous metal substrate of active material without damage to the metal foam substrate and which facilitates mass production of welding the metal strip connector or terminal to a cleaned localized surface area of the metal foam substrate.

BACKGROUND OF THE INVENTION

Attempts have been made to successfully bond a metal strip connector to an electrode incorporating a foam type substrate for an electrochemical cell, particularly applicable to electrochemical cells having an alkaline electrolyte with at least one of the electrodes taking the form of a porous metal substrate containing active material. Typically, such substrate functions as a porous support or lattice structure, and wherein similar to a sponge, voids are interconnected in a three-dimensional network classically referred to as "foam". Such lattice structure substrate prior to being filled with active material has a porosity in excess of 95%. After filling of the pores with active material, the electrode is compressed to a design thickness to facilitate assembly and proper cell operation after manufacture of the cell.

In investigations undertaken by the applicant and the corporate assignee of this application, it was determined that considerable problems arise when connecting nickel connector strips, conventionally called "Ni-tabs" to the foam type substrate electrodes, conventionally termed "Ni-foam electrodes". The investigations resulted in an appreciation that it is not possible to weld onto foam containing active material. Attempts made to ultrasonically weld the Ni-tab directly to the $Ni(OH)_2$ pasted foam failed due to the resistivity of the paste. In the investigations, effort was concentrated on the removal of a $Ni(OH)_2$ paste off a Ni-foam porous substrate and to perform the weld. Air jets applied locally on a limited area of the Ni-foam substrate at 100 psi compressed air pressure failed to remove the paste. Initial efforts at ultrasonic paste removal were also unsuccessful.

Subsequent to the making of the claimed invention herein, the applicant became aware of the existence of U.S. Pat. No. 5,086,969, issued Feb. 11, 1992 and entitled "METHOD OF BONDING A METAL CONNECTION TO AN ELECTRODE HAVING A FOAM TYPE SUBSTRATE FOR AN ELECTROCHEMICAL CELL, AND AN ELECTRODE OBTAINED BY THE METHOD" to Jean-Marc Guerinault and Joel Brunarie of France, and assigned to SAFT of Romainville, France, the parent of the corporate assignee of this application, SAFT AMERICA, INC.

U.S. Pat. No. 5,086,969 recognizes a common bonding problem in this art and solves that problem by a different bonding method for bonding a metal strip connector to an electrode having a compressed foam type substrate filled with active material. The bonding method comprises forming at least one hole through the compressed active material filled foam type substrate and a surrounding zone, causing a metal tongue to penetrate superficially into a first face of the electrode and welding a metal strip connector to the metal tongue from the opposite face of the electrode, with welding being effected through the hole in the electrode. Preferably, the metal strip connector includes a boss sized to and received in the hole to facilitate welding of the connector to the tongue from the end of the boss penetrating the hole.

While such bonding of the metal strip connector to the foam type substrate is successful, it requires the incorporation of a separate metal tongue or backing member, thereby increasing the thickness and bulk of the connection at the substrate, it reduces the active area of the active filled porous substrate available and tends to stiffen the cell structure in the vicinity of the active area of the substrate.

It is therefore a primary object of the present invention to provide an improved, low cost, high-speed method of removing the $Ni(OH)_2$ active material within a localized area, preferably throughout a foam type substrate from one face to the other, which method is applicable to fully automated process manufacturing of electrochemical cells, which readily permits subsequent direct welding of a Ni-tab to the $Ni(OH)_2$ paste-free foam at the localized area of paste removal, which eliminates the need for a tongue or backing member and which neither destroys nor deforms the Ni-foam substrate in the localized area effected by the cleaning process and the subsequent welding or areas outside thereof, and which effects a connection between the Ni-tab and the Ni-foam electrode of satisfactory strength and of low electrical resistance.

DESCRIPTION OF THE PREFERRED EMBODIMENTS

Figure 1:
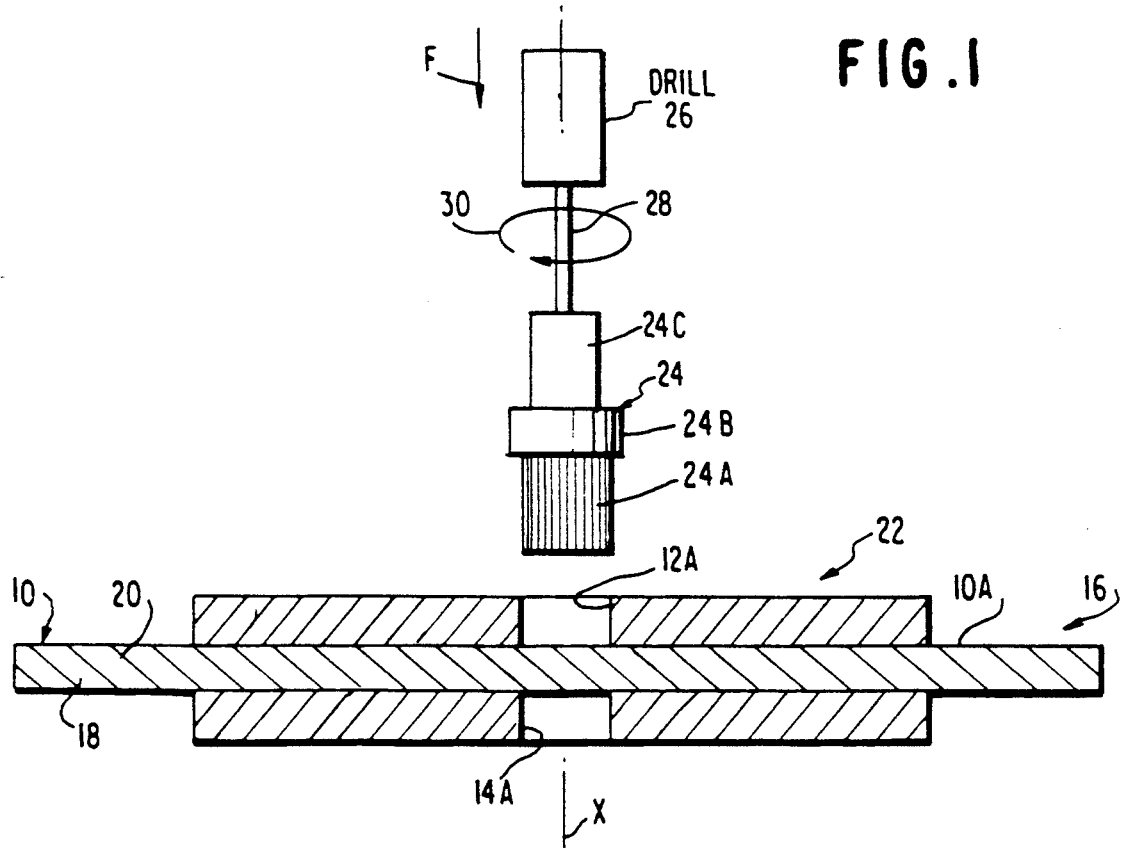
FIG. 1 is a highly diagrammatic vertical sectional view of an electrode substrate subject to a first step in cleaning of a Ni-foam electrode substrate filled with active material, forming one embodiment of this invention.
Figure 2:
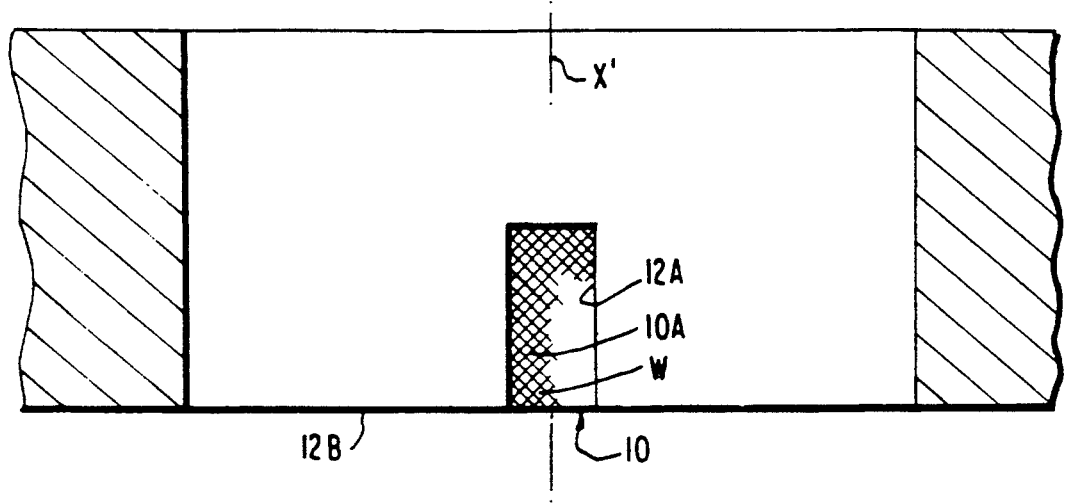
FIG. 2 is a top plan view of the upper and lower fixture plates sandwiching the $Ni(OH)_2$ pasted Ni-foam electrode of FIG. 1.
Figure 3:
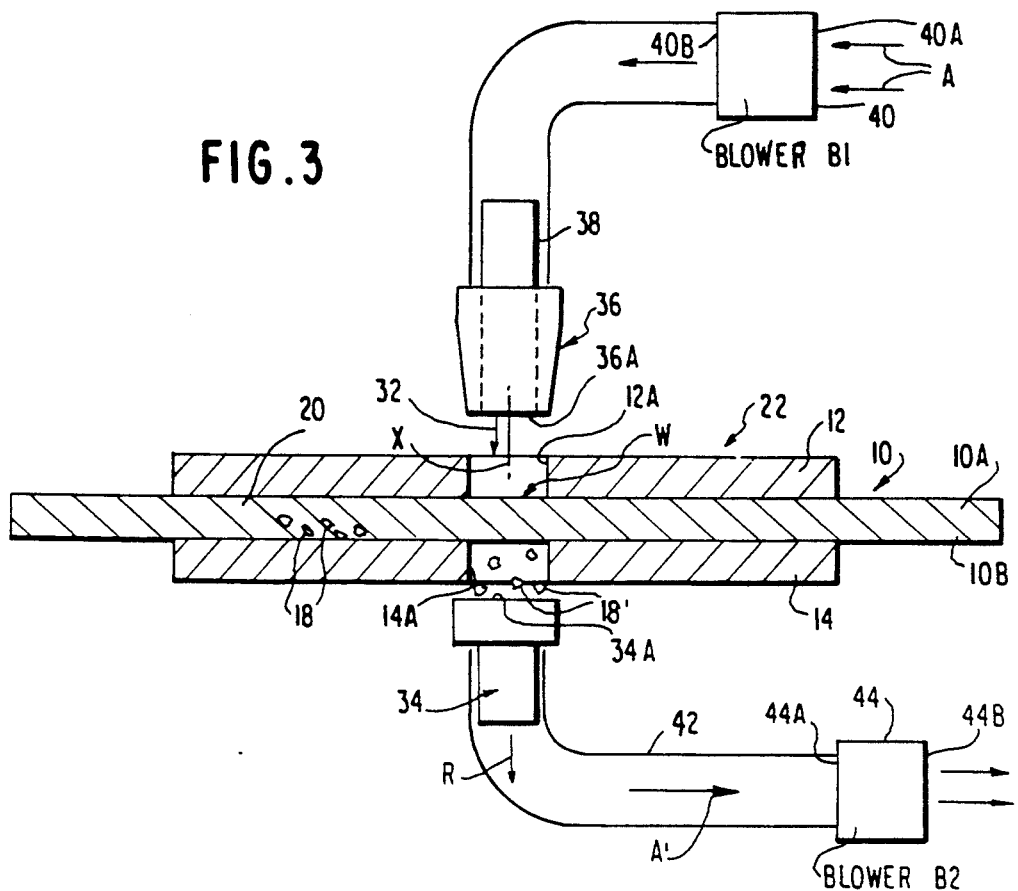
FIG. 3 is a similar vertical sectional view to that of FIG. 1 with the $Ni(OH)_2$ pasted Ni-foam electrode being subject to a second step of the present invention to render a localized area of the Ni-foam substrate electrode free of the active material and in condition for direct welding of a Ni-tab thereto.

Referring to drawing FIGS. 1, 2 and 3, these drawing figures evidence a setup permitting successful localized cleaning and removal of the $Ni(OH)_2$ paste or its equivalent active material within a Ni-foam electrode substrate indicated generally at 10 and positioned between an upper fixture plate 12 and a lower fixture plate 14. The $Ni(OH)_2$ pasted Ni-foam electrode is indicated generally at 16 and is sandwiched by the plates 12, 14. It should be appreciated that the Ni-foam substrate 10 of the electrode 16 is highly fragile and the upper fixture plate 12 rests lightly on the substrate 10. The substrate 10 extends longitudinally between the plates and, as illustrated in FIG. 2, has a surface 10A exposed through an open elongated slot 12A of plate 12, which slot opens from one side edge 12B towards the other, and which terminates approximately half-way through the upper fixture plate 12.

A similar sized and positioned slot 14A is provided within the lower fixture plate 14, which is a mirror image to slot 12A, and is aligned therewith. The substrate 10 acts as a support for the Ni(OH)$_2$ paste, which fills open pores within the porous substrate 10. The first step in removing the paste 18 from the interior of the open mesh form substrate 10 from the three-dimensional network 20 creating the voids receiving the paste 18, i.e., the foam 20 of the substrate 10, involves the step of mechanical brushing which removes most of the paste material from opposite sides or surfaces 10A, 10B, while the substrate 10 is captured within a fixture indicated generally at 22 and defined principally by upper fixture plate 12 and the fixture plate 14. In this embodiment of the invention, a rotary brush indicated generally at 24 of a diameter of approximately 0.125 inch corresponding generally to the width of the slots 12A, 14A of respective fixture plates 12, 14 has nylon bristles 24A thereof inserted within the slot 12A. The brush 24 includes a collar 24B and has a shank 24C extending from collar 24B at the end opposite to the nylon bristles 24A. In the schematic drawing of FIG. 1, an electric drill or other suitable rotary drive mechanism 26 is mechanically coupled to the brush shank 24C; the mechanical connection is indicated schematically by dash line 28. In the illustrated embodiment, the nylon bristles 24A may be rotated about a vertical axis X, coincident with a center line running through line slots 12A, 14A, axis X', FIG. 2. Rotation of the brush 24 is indicated schematically by the headed arrow 30.

As may be appreciated, a light axial force F is applied to the nylon bristles 24A in a downward direction, FIG. 1, to effect localized brushing over the upper surface 10A, confined by the opposed sidewalls and the end wall of the slot 12A within the upper fixture plate 12, thereby dislodging Ni(OH)$_2$ paste 18 from the three-dimensional mesh or lattice network of the porous foam substrate 10. While the upper fixture plate 12 and the lower fixture plate 14 tend to hold the substrate 10 steady, the vertically aligned slots 12A, 14A of respective fixture plates 12, 14 define the extent of localized removal of the active material (Ni(OH)$_2$). Subsequent to removal of the Ni(OH)$_2$ paste from the vicinity of the upper face 10A of the fixture within a cleaning surface area as defined by slot 12A, the fixture 22 is flipped so as to position the lower fixture plate beneath the brush 24, and with the brush 24 having its axis X aligned with the center line X' of the slot 14A.

The brushing step is then repeated for dislodging the Ni(OH)$_2$ paste from the three-dimensional mesh network 20 over a localized portion of the bottom surface 10B of that foam substrate 10. Turning to FIG. 3, in which the upper fixture plate 12 again is positioned above the lower fixture plate 14, with the plates 12, 14 sandwiching the foam substrate 10, the foam substrate 10, constituting a workpiece W, is in position for the next step in the removal of the Ni(OH)$_2$ paste over the extent of the localized area of the substrate 10 defined by aligned slots 12A, 14A.

With the setup fixture 22 in the same position as that in FIG. 1, the next step requires the removal of the brush 24 and its driving means such as an electric drill or the like 26.

It was determined that during the brushing step in accordance with FIG. 1, brushing tends to loosen the Ni(OH)$_2$ and to break it into particles 18', which particles may still be retained within the interstices of the Ni-foam substrate 10, i.e. loosely captured by the three-dimensional network 20. The setup as illustrated in FIG. 3 permits the separation of the Ni(OH)$_2$ paste small particles 18', which are seen as being within the elongated slot 14A of the lower fixture plate 14. Such is effected either by way of an air jet indicated generally at 32, from air nozzle 36, FIG. 3, or via air jet 32 acting in conjunction with a vacuum box, indicated generally at 34. The air jet 32 exits from a conventional air nozzle 36, coupled to a hose 38 at one end. The other end of the hose 38 is coupled directly to a blower 40 powered by an electric motor and causing air, indicated by arrows A, to enter an inlet side 40A of the blower for discharge from an opposite discharge side 40B. The air jet 32 is directed from an orifice 36A. Orifice 36A is defined by an axial bore 36B of 0.56 inches in diameter, within nozzle 36 the air jet 32, being generally sized to the width of the slot 12A.

In the first embodiment of this invention, different air pressures were applied, ranging from regular shop air at 100 psi up to about 175 psi. Various samples blown with air at different pressures throughout that range led to the determination that air jets 32 at about 100 psi result in the minimum pressure to realize subsequently a successful ultrasonic double-tab weld to opposite faces 10A, 10B of the substrate 10 within the areas defined by elongated, vertically aligned slots 12A, 14A of the upper and lower fixture plates 12, 14, respectively. Single-tab ultrasonic welds were not successful, utilizing the conventional air nozzle in the manner described above.

As further illustrate in FIG. 3, enhancement and maximizing of the removal of the Ni(OH)$_2$ paste was achieved by the utilization of vacuum box 34, which vacuum box was connected via a section of hose 42 to a second blower 44, discharging air from an outlet side 44B, open to the atmosphere. The opposite, suction side 44A of the blower 44 is coupled via the hose to the vacuum box 34. The vacuum box was maintained at a relatively low vacuum level. Further, the presence of the vacuum box 34, with a suction opening 34A thereof proximate to the lower slot 14A, permits the vacuum pressure within the vacuum box to be applied locally to the Ni-tab weld area defined by superimposed slots 12A, 14A and without disturbing the major mass of the active material in the form of Ni(OH)$_2$ paste filling the interstices of the foam substrate outside of the localized weld area W, FIG. 3. The particles 18' of Ni(OH)$_2$ or its equivalent active material pass through the vacuum box and may be discharged therefrom after selective removal from the air stream A' passing to the suction side 14A of blower 44. Schematically, headed arrow R identifies the separation step of the particles 18' of Ni(OH)$_2$ sucked into the vacuum box due to the positive force application of jet stream 32 combined with the suction air stream A' within hose 42 leading to blower 44. Thus, in a first embodiment, the applicant achieved sufficient localized removal of the Ni(OH)$_2$ paste from the Ni-foam substrate 10 by mechanical brushing of both sides or surfaces 10A, 10B of the Ni-foam electrode substrate 10 over surface area W, and the blowing off the Ni(OH)$_2$ active material of the brush cleaned substrate with an air jet 32 created by 100 psi compressed air flowing through hose 38 and the air nozzle 36 when held in the especially designed fixture 22. Subsequently, the Ni-tabs were welded to the surface area W of the foam substrate 10 either ultrasonically by a double-tab method to opposite surfaces 10A, 10B within the cleaned zone or area W, or by applying electric resistance spot-welding to a single tab onto the surface 10A, at the localized area W. An example using the procedure of the first embodiment as described above follows:

EXAMPLE 1

Figure 4:
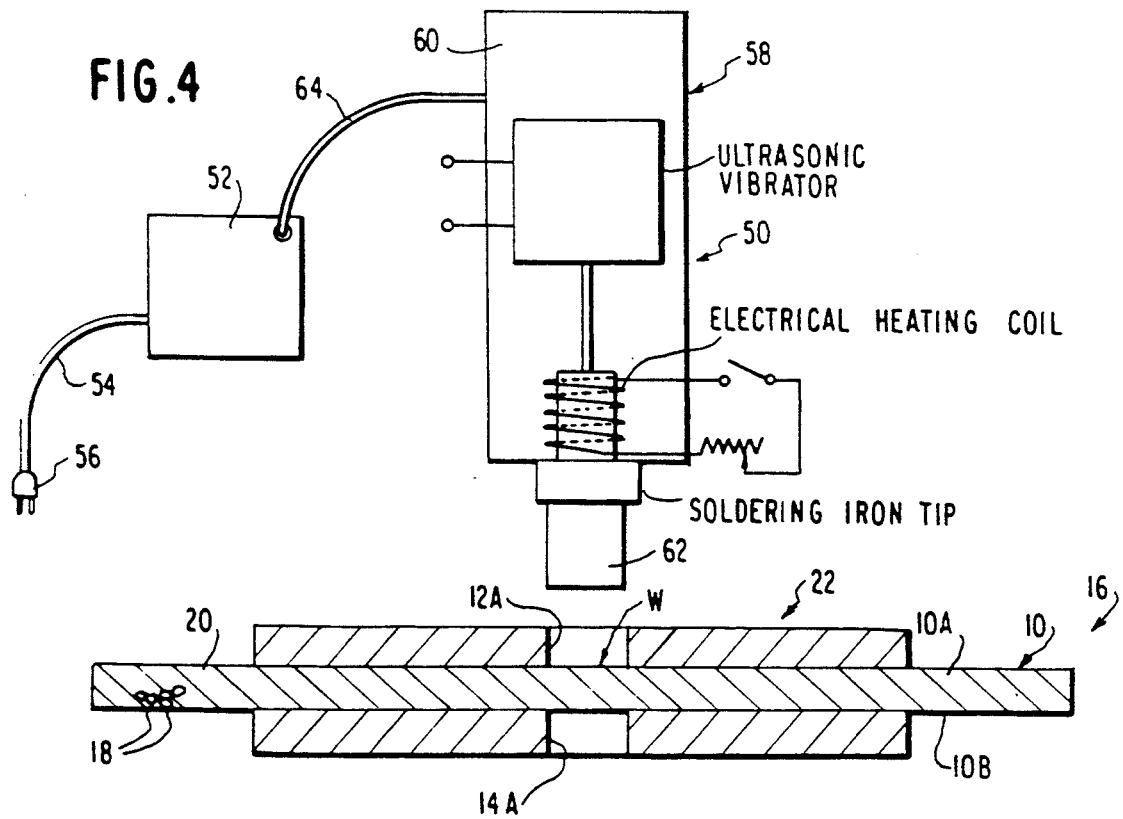
FIG. 4 is a highly diagrammatic, vertical sectional view of an $Ni(OH)_2$ pasted Ni-foam electrode subject to paste removal of a localized area of the Ni-foam electrode in a first step of an alternate method forming a second embodiment of the present invention.

Mechanical Brushing Method:

Brush specifications:
0.120 inch diameter × 0.250 inch long brush with nylon
Brush speed: 14000 RPM
Air-Jet Specifications:
Air pressure: 150 psi minimum
Nozzle: 0.156 inch dia. regular air nozzle
Fixture: As illustrated in FIGS. 1, 2 and 3
Ultrasonic Weld Set-Up:
Welder type: Sonobond Ultrasonics - MH2014D/2015FC
Horn size: 0.250 inch × 1.250 inch
Settings:
0  Matching: D          0  Weld Time: 0.45 S
0  Tuning: 2            0  Power Level: 4
0  Squeeze Time: 0.1 S  0  Pressure 30 psi
Electric Resistance Spot-Weld Set-Up:
Welder Type: Hughes - VTA-61
Settings: 40 Ws - Medium Range @ Level: 5 –
Pressure sensing position
Electrode Size: 0 0.125 inch Turning to FIG. 4, that drawing figure is taken further in conjunction with FIGS. 2 and 3 and illustrate the setup for utilization of an alternative method of localized cleaning of a small surface area W of the Ni-foam substrate electrode bearing in the interstices of the foam, the Ni(OH)$_2$ paste, all in accordance with a second embodiment of the invention. In this embodiment, like elements bear like numeral designations. FIG. 4 illustrates the initial step, while FIG. 3 illustrates the setup during the second step of air jet removal of the Ni(OH)$_2$ paste particles. In the first step, ultrasonic and heat application via the ultrasonic soldering iron is indicated generally at 50 in FIG. 4. Preferably, as per FIG. 3, both the air nozzle 36 and the vacuum box 34 is employed. The net result is an effective two-part ultrasonic scrubbing, heat application and air jet/vacuum cleaning operation.

An ultrasonic soldering system, illustrated generally at 50, is employed, such as a commercially available Amtech Model AT-85 Ultrasonic Soldering System from American Technology, Inc. of Milford, Conn.

As in the first embodiment and in accordance with FIG. 1, the fixture 22 is employed, consisting of the upper fixture plate 12 and the lower fixture plate 14, each with respective elongated slots 12A and 14A, in vertical alignment and with the fixture plates 12, 14 on opposite sides or surfaces 10A, 10B of the porous foam substrate 10 of the electrode 16 and with the Ni(OH)$_2$ paste 18 filling the interstices 20 of the Ni-foam substrate 10. An ultrasonic soldering iron 62 forms one element of the soldering system 50, further comprised of a generator 52 having electrical leads 54 terminating in a electrical plug 56 for connection to an available wall socket (not shown) or other source of electrical energy.

A tool head indicated generally at 58 is provided with a hand or gimbal mounted handle 60 and detachably carries a soldering iron tip 62, which may be an H-5 ¼ inch chisel tip, also supplied by American Technology, Inc. The hand or gimbal held tool head 58 includes a 25 Watt electrical heater coil for supplying heat directly to the chisel tip 62. The width of the chisel tip is on the order of the width of the aligned slots 12A, 14A of the fixture 22. The chisel tip may be applied at an incline, oblique to the upper surface 10A of the Ni-foam substrate 10 of electrode 16, initially. The chisel tip 62 is movable longitudinally in the slot 12A over the localized surface area W to be cleaned for subsequent welding of a single Ni-tab or a double-tab to surface 10A, 10B, respectively, depending upon whether welding is to be effected by an ultrasonic weld setup or a resistance spot-weld setup. The substrate 10 may be flipped over and the heated ultrasonic vibrated chisel tip scraped over the corresponding bottom surface 10B defined by exposed slot 14A.

The generator 52 provides the source of electrical energy via cable 64, FIG. 4, to the tool head 58. A suitable transducer within the power head provides ultrasonic vibrational energy to the chisel 62 at a frequency of 30 kHz with an R.F. power output of 35, 20 and 10 Watts to the tool head. The generator controls provide both head and sonic energy at low, medium and high settings. The heater power output is 35, 20 and 10 Watts. The weight of the iron chisel tip is 340 grams, and a very light pressure is applied to the tip 62 to press it in contact with the surface area W of the substrate 10, subject to combined heat and light scrubbing action of the ultrasonic vibrated chisel tip 62. The ultrasonic motion at the tip 62 of the soldering iron acts simultaneously with the applied heat to scrub the surface 10A of the Ni-foam substrate 10, free of the Ni(OH)$_2$ paste and is highly successful in removing the paste much faster and cleaner in comparison with the mechanical brushing method of the first embodiment. The variable setting of the ultrasonic transducer and electrical heating coil in proximity to the chisel 62 provides ready variable control to the system, thereby minimizing the removal time. Since the cleanness of the substrate surface is enhanced in the second embodiment by heat and vibratory scraping, it is possible to blow off the substrate with an air jet quickly in the subsequent air jet cleaning step as shown in FIG. 3, using the preferred lower pressure of 100 psi, that is a common shop compressed air. Ni(OH)$_2$ paste removal, enhanced by the use of the vacuum box 34 in FIG. 3, is followed by a single Ni-tab or double-tab welding, effected ultrasonically or by spot-welding as described previously in conjunction with the first embodiment. An example using the method of the second embodiment in conjunction with the ultrasonic soldering system described above follows:

Ultrasonic Soldering System:

System Specifications:
Amtech Model AT-85 Ultrasonic Soldering System with up to 35W heater power, up to 35W R.F. power output, 30 KHz, and a 0.250 inch chisel tip (Model #H-5).
System Set-Ups:
0  Heater set-up: High
0  Ultrasonic set up: High
Air-Jet Specifications:
Air pressure: 100 psi (regular shop-air)
Nozzle: 0.156 inch dia. regular air nozzle -continued Ultrasonic Soldering System:

Fixture: See FIGS. 2 and 4
Ultrasonic Weld Set-Up:
Welder Type: Sonobond Ultrasonics - MH2014D/2015FC
Horn Size: 0.250 inch × 1.250 inch
Settings:
0  Matching: D       0  Weld Time: 0.45S
0  Tuning: 2         0  Power Level: 4
0  Squeeze Time: 0.1 S  0  Pressure: 30 psi
Electric Rsistance Spot-Weld Set-Up:
Welder Type: Hughes VTA-61
Settings: 40 Ws - Medium Range @ Level: 5—
Pressure sensing position
Electrode size: 0 0.125 inch

COMPARISON BETWEEN FIRST AND SECOND EMBODIMENTS OF THE INVENTION

Reference to Table 1 herebelow evidences the operation time to effect localized removal of the Ni)OH)$_2$ paste from the Ni-foam substrate via the two embodiments of the invention as described above including the total time employing ultrasonic welding and spot-welding for each embodiment.

TABLE 1

OPERATION TIME FOR 1ST AND 2ND METHODS-STEPS

|  | Mech. Brushing | U. Sonic Soldering System |
|---|---|---|
| 1st Side | 5 Min. | 60 S |
| 2nd Side | 5 Min. | 60 S |
| Air-Blow Off | 30 Sec. | 15 Sec. |
| Spot Weld (Double tab) | 30 Sec. | 30 Sec. |
| Spot Weld (Single Tab) | 15 Sec. | 15 Sec. |
| U. Sonic Weld (Double Tab) | 60 S | 60 S |
| Total w/Ultrasonic Weld: | 6 Min. 30 S | 2 Min. 15 |
| Total w/Spot Weld | 5 min. 45 S | 1 Min. 30 S Single Tab |
|  | 6 Min. | 1 Min. 45 S Double Tab |
| Total Fixturing Time: | 30 S |  |

For the examples given, electrical resistance tests were made on the two connections, a stapled connection to single-tab spot-welding and ultrasonic double-tab welding of welded connections. The results are set forth in Table 2 below:

TABLE 2

ELECTRIC RESISTANCE RESULTS

| Connection Ni-Tab/Ni-Foam | Current A | Voltage mV | Connection E. Resist. Ohms |
|---|---|---|---|
| *Stapled | 0.500 | 7.84 | 0.0157 |
| *Spot Welded (Single-Tab) | 0.500 | 4.09 | 0.0082 |
| *Ultrasonically Welded (Double-Tab) | 0.500 | 6.81 | 0.0136 |

Notes:
1. Welded connections were made on mechanically brushed and air blown-off (with 150 psi air) Ni(OH)$_2$ pasted surface.
2. Electrode test specimen dimensions are: 0.610 L × 0.568 W × 0.027 Thick in inches.
3. Room Temperature: 25° C.

From the above, certain conclusions can be made with respect to the invention as disclosed herein relative to the two embodiments. Both methods successfully remove the Ni(OH)$_2$ paste or equivalent active material, with the method of the first embodiment employing mechanical brushing of both sides of the electrode substrate followed by air jet cleaning, coupled with suction application to the opposite surface of the substrate. The second embodiment uses an ultrasonic soldering iron subject to the application of vibrational energy and vibrational energy induced contact with the surface of the substrate, plus heat application, followed by air cleaning similar to that of the first embodiment. The preferred embodiment, speed-wise is the second embodiment. The second embodiment is seen as much faster for effectively removing the Ni(OH)$_2$ paste in the local surface area W to which the electrical connections are effected, preferably by ultrasonic or spot-welding. Paste removal is much faster, 60 seconds for the ultrasonic soldering iron method versus 5 minutes for mechanical brushing. Further, the second embodiment uses regular shop air at 100 psi versus the higher pressure (150 psi) required with mechanical brushing.

Either of the two methods can be readily integrated into a production line at two successive stations, one for removing the paste from both sides at the same time, and the second to blow off with air from one side only and to receive the powder from the other side by a vacuum collector or vacuum box. Both electrical resistance spot-welding and ultrasonic welding can be employed successfully to weld a single Ni-tab or a double-tab on the cleaned Ni-foam surface. Spot-weld connections can effect single-tab connection from one side only. Two tabs from opposite sides may be required for ultrasonic welded connections in order to obtain a good joint with low resistance coupling. Welding may be readily effected in an automated process at a third station on the line. From Table 2 it is apparent that a spot-welded connection effects the lowest electric resistance about 0.0082 ohms versus that of 0.0136 ohms for the ultrasonically welded connection and both contrast favorably to a 0.015 ohms for a stapled connection.

While the invention has been described in accordance with two embodiments, it may be perceived that various changes may be made in the process parameters of respective embodiments without departing from the spirit and scope of the invention, which is limited solely to the claims appended hereto.

What is claimed is:

1. A cleaning method for cleaning a localized area of an open pore foam type metal substrate of an electrical chemical cell electrode, said substrate being filled with active material, and then compressed, said cleaning method comprising:
   placing said substrate within a fixture with at least one surface of the substrate exposed,
   scrubbing a localized area of the exposed surface of the substrate with a heated soldering iron head under pressure while subjecting said soldering iron head to ultrasonic vibration, whereby said active material in the vicinity of said one surface at said localized area is nearly instantaneously dislodged from the pores of the substrate, and
   blowing compressed air through said substrate at said localized area to remove the dislodged active material from a three-dimensional network of the open pore foam type substrate, without deformation to the open pore foam type metal substrate, thereby facilitating the mass production welding of metal strip connectors or terminals to said clean, localized surface area of the metal foam substrate.

2. The cleaning method as claimed in claim 1, further comprising the step of applying suction to the opposite surface of the substrate from said localized surface subjected to blowing to facilitate removal of dislodged particles of active material from the network of the open pore foam type metal substrate.

3. The cleaning method as claimed in claim 2, wherein said step of placing said substrate in a fixture comprises confining said substrate between a pair of fixture plates having aligned openings therein defining said localized area of said at least one surface of said substrate subjected to scrubbing via said heated soldering iron head.

4. The cleaning method as claimed in claim 1, wherein said step of placing said substrate in a fixture comprises confining said substrate between a pair of fixture plates having aligned openings therein defining said localized area of said at least one surface of said substrate subjected to scrubbing via said heated soldering iron head.

5. The cleaning method as claimed in claim 1, wherein aligned, localized surface areas of said substrate opposite sides thereof are scrubbed with said heated soldering iron head under pressure while subjecting said soldering iron head to ultrasonic vibration.

6. The cleaning method as claimed in claim 1, wherein said heated soldering iron head comprises a chisel tip, and said scrubbing step comprises applying said chisel tip while subjected to said ultrasonic vibration under pressure at an oblique angle to the localized area of the least one surface of said substrate during scrubbing.

7. The cleaning method as claimed in claim 6, wherein ultrasonic vibrational energy is applied to said chisel at a frequency of approximately 30 kHz.

8. The cleaning method as claimed in claim 1, wherein said step of blowing compressed air through said substrate at said localized area comprises blowing said compressed air at a pressure of 100 psi.

9. The cleaning method as claimed in claim 1, wherein said substrate is a Ni-foam substrate, said active material is Ni(OH)$_2$ paste, wherein said scrubbing step is applied to opposite sides of said open foam type metal substrate at said localized area for a time period of approximately one minute each, and wherein said blowing step is applied for approximately 15 seconds.

10. A cleaning method for cleaning a localized area of an open foam type metal substrate of an electrochemical cell electrode, said substrate being filled with active material and then compressed, said cleaning method comprising:
placing said substrate within a fixture with opposite surfaces of the substrate exposed over at a localized surface area of said substrate;
brushing under pressure said localized surface area of said substrate on said opposite surfaces thereof for a period of time to dislodge active material from the network of the open foam type metal substrate; and
blowing compressed air at sufficient pressure through said substrate at said localized area from one side of said substrate to the other to remove dislodged active material particles from the foam type metal substrate.

11. The cleaning method as claimed in claim 10, further comprising the step of applying suction to the opposite surface of the substrate from the surface subjected to compressed air blowing to facilitate removal of the dislodged particles of active material in a direction from said one surface to said opposite surface.

12. The cleaning method as claimed in claim 10, wherein said step of placing said substrate within a fixture comprises placing said substrate between a pair of fixture plates having aligned elongated slots therein defining said localized surface area of said substrate and limiting brushing of said opposite surfaces of said open foam type metal substrate to said localized surface area defined by said aligned elongated slots within respective fixture plates from one lateral side of said fixture plates, and said step of brushing the opposite surfaces of said substrate comprises brushing the localized surface area of said substrate in the longitudinal direction of the longitudinal slots.

13. The cleaning method as claimed in claim 10, wherein said step of brushing a localized area of said substrate comprises rotating a cylindrical brush head having bristles extending axially from one end thereof about the axis of the brush head at 14,000 RPM and simultaneously applying of the bristles under pressure against the localized surface area of the exposed opposite surfaces of the substrate.

* * * * *